United States Patent [19]
Olson et al.

[11] Patent Number: 5,761,045
[45] Date of Patent: Jun. 2, 1998

[54] MODULAR, REDUNDANT, HOT SWAPPABLE, BLIND MATE POWER SUPPLY SYSTEM

[75] Inventors: Robert N. Olson, Mountain View; William H. Bull, Los Gatos, both of Calif.

[73] Assignee: Apple Computer, Inc., Cupertino, Calif.

[21] Appl. No.: 577,331

[22] Filed: Dec. 22, 1995

[51] Int. Cl.$^6$ ........................................ H05K 7/16
[52] U.S. Cl. .................. 361/726; 361/724; 361/728; 361/752; 361/740; 312/223.2
[58] Field of Search ........................ 361/683–686, 361/724–727, 728, 729–132, 794; 312/223.2; 439/157

[56] References Cited

U.S. PATENT DOCUMENTS

| | | | |
|---|---|---|---|
| 2,944,864 | 7/1960 | Krivulka | 361/725 X |
| 4,914,552 | 4/1990 | Kecmer | 361/726 X |
| 4,964,018 | 10/1990 | Mallory et al. | 361/725 |
| 5,020,151 | 5/1991 | Sampei e tal. | 361/725 X |
| 5,586,003 | 12/1996 | Schmitt et al. | 361/683 |
| 5,593,220 | 1/1997 | Seid et al. | 361/724 X |

OTHER PUBLICATIONS

Jack Graham, "The Dos and Don'ts of Specifying a Hot–Swap Power Supply," *Electronics Products*, Mar. 1993, pp. 35–37.

*Primary Examiner*—Leo P. Picard
*Assistant Examiner*—Jayprakash N. Gandhi
*Attorney, Agent, or Firm*—Blakely, Sokoloff, Taylor & Zafman

[57] ABSTRACT

The present invention provides a floating-plate connector assembly which includes a mounting plate on which are mounted a combined power and signal pin connector, an alternating current connector and a pair of guide pins. The mounting plate is in turn mounted on the rear panel of a power supply module so that the connector plate may move within predetermined limits in two axes. The floating-plate connector assembly blind mates with a printed circuit board located within a power supply chassis. The present invention also provides a power supply system having means for securing power supply modules to the chassis that includes a handle which is pivotably connected to the power supply. The handle includes a cam and teeth which respectively engage a notch and apertures located on the base of the chassis when rotated in a first direction. The power supply module is disengaged from the chassis when the handle is rotated in a second direction opposite to the first direction. The present invention also provides a mounting assembly for securing a printed circuit board in place in a chassis without the use of removable fasteners. In addition, the present invention provides an assembly for securing a face-plate to a chassis without the use of removable fasteners. The power supply system of the present invention also provides a brake lever assembly which facilitates the securing of a power supply system to a fixed location while providing the option of mobility.

6 Claims, 6 Drawing Sheets

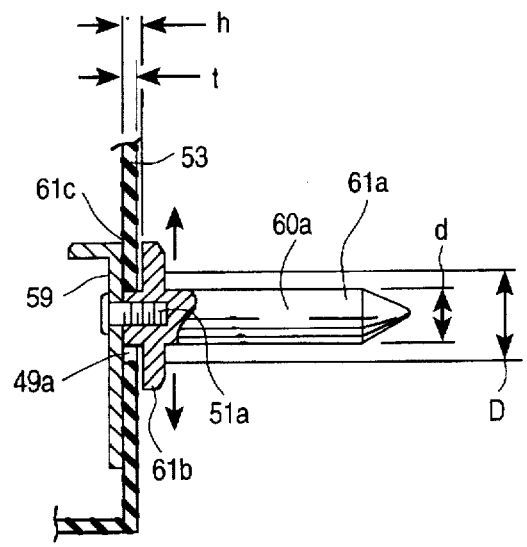
FIG_2A
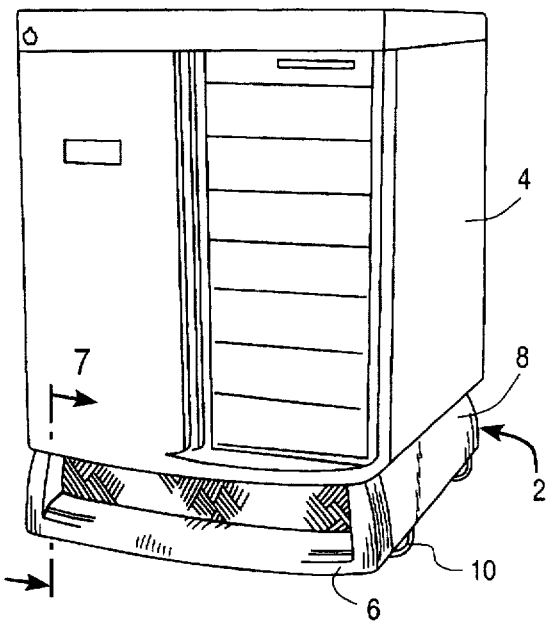
FIG_1
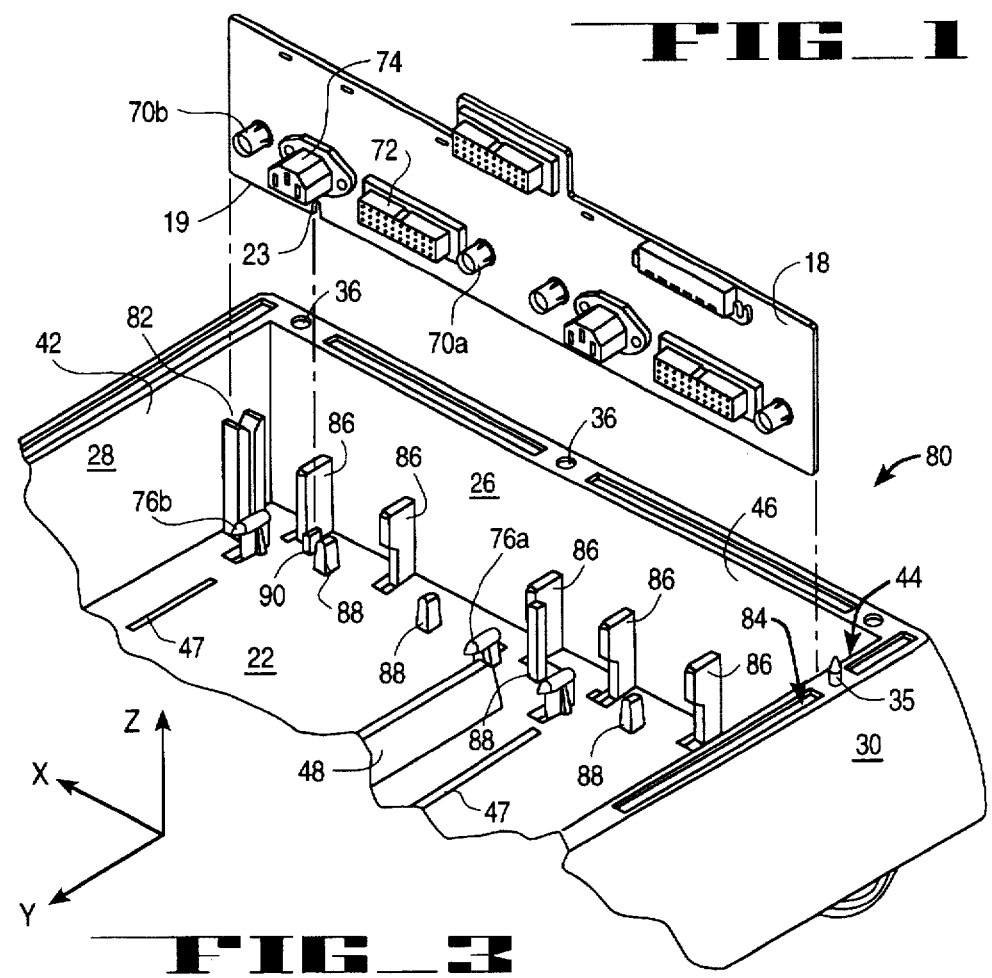
FIG_3

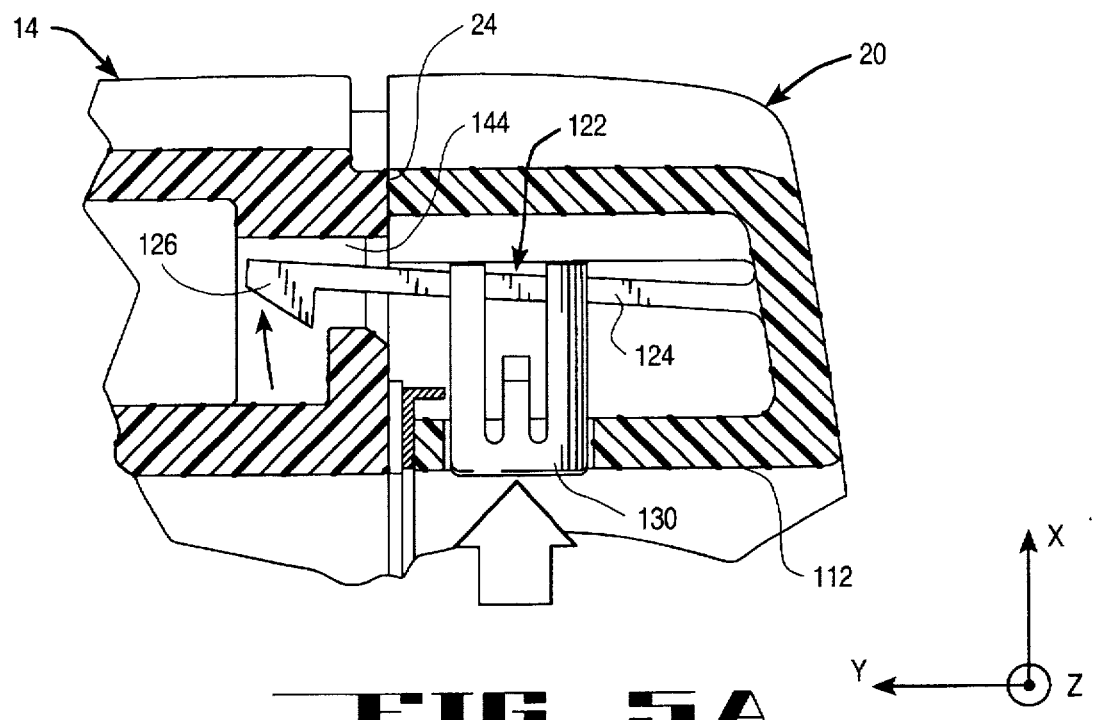
FIG_5A
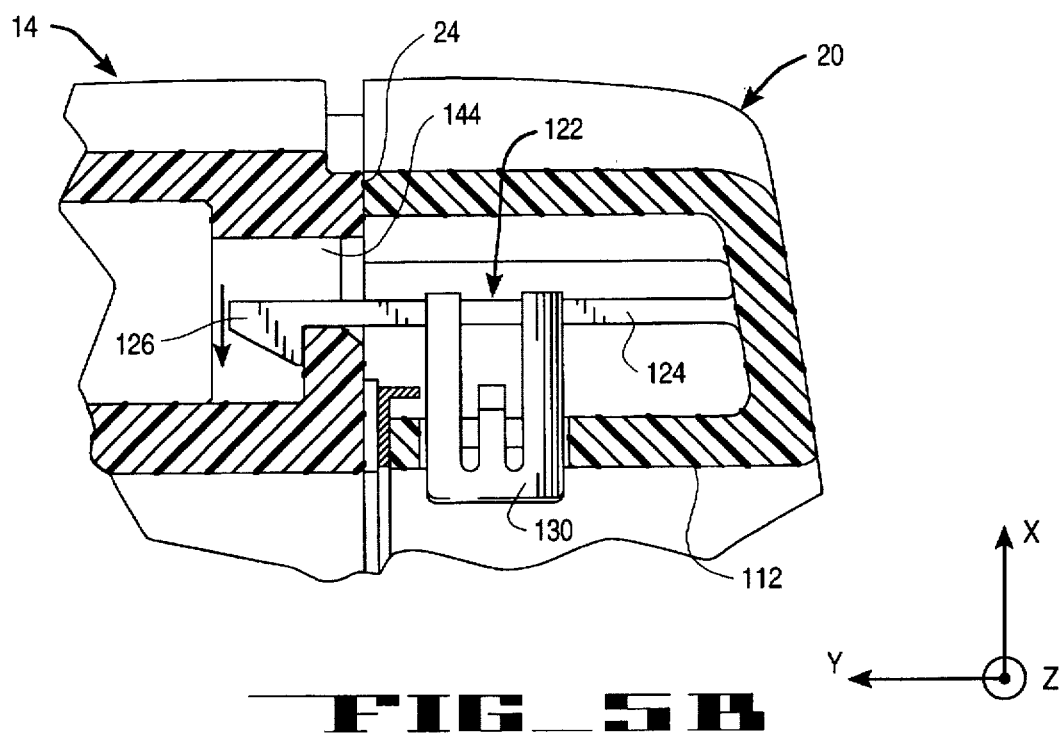
FIG_5B

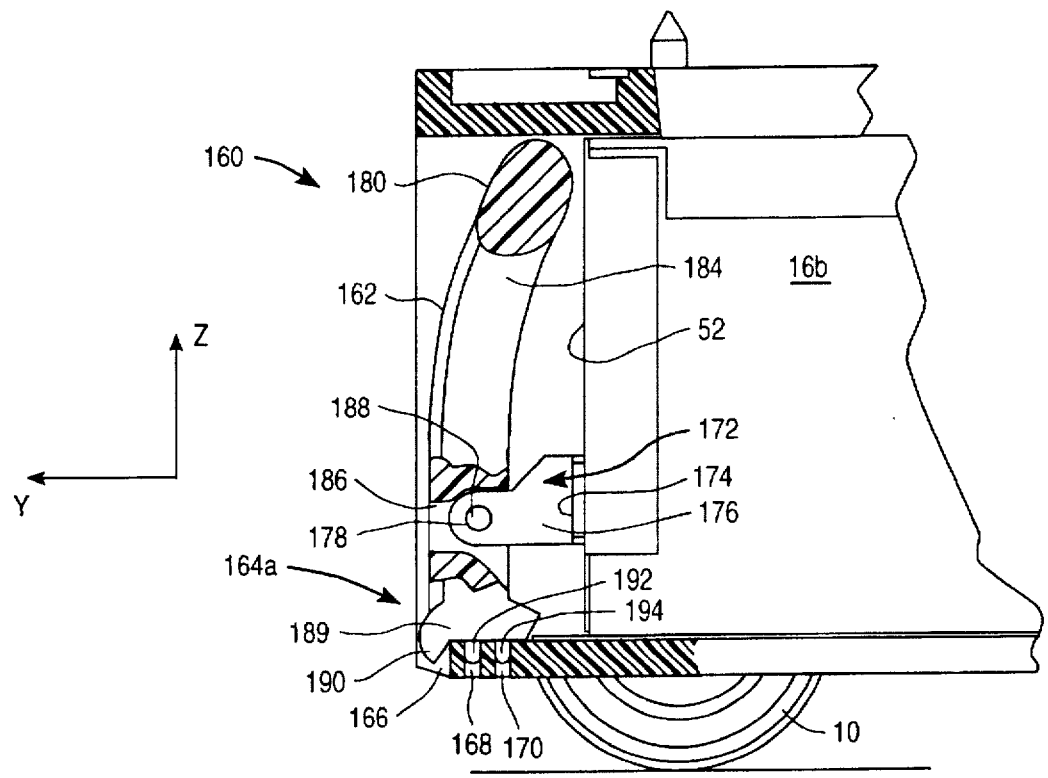
FIG_6A
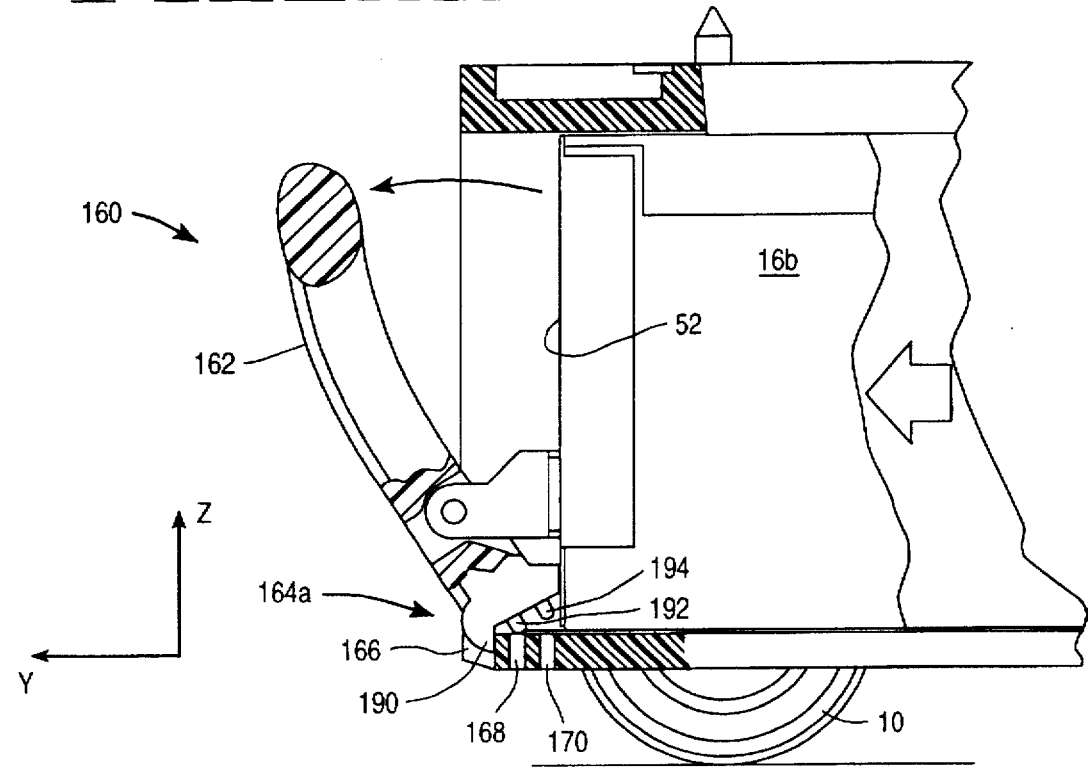
FIG_6B

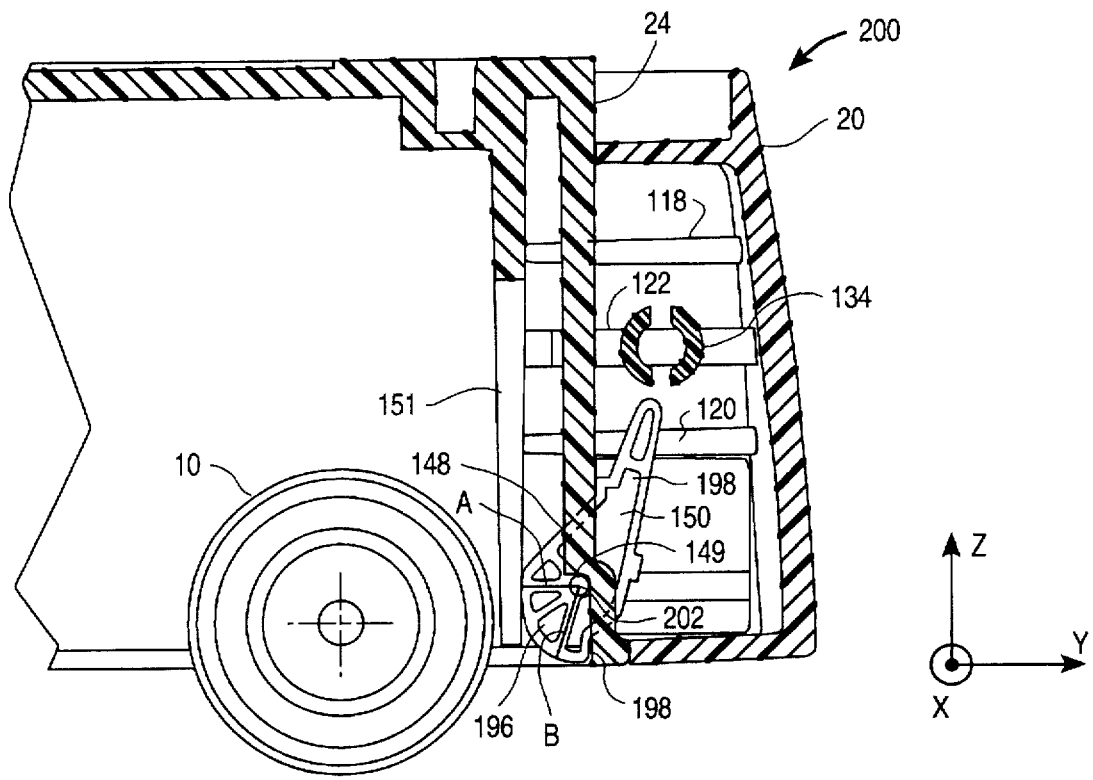
FIG_7A
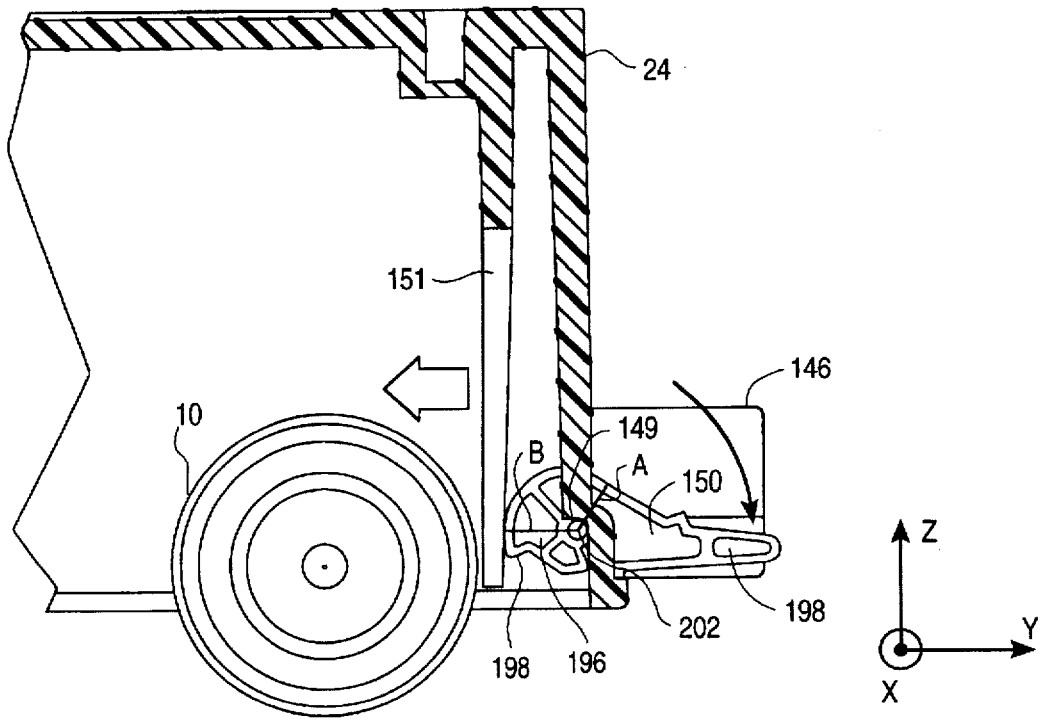
FIG_7B 5,761,045

MODULAR, REDUNDANT, HOT SWAPPABLE, BLIND MATE POWER SUPPLY SYSTEM

BACKGROUND OF THE INVENTION

1. Field of the Invention

The present invention relates to power supply systems, and more particularly, to a modular power supply system having a unibody chassis for housing two blind-mating power supply modules which are interconnected to a system via a printed circuit board assembly. The chassis and power supply assembly of the present invention facilitate quick and convenient installation, removal and replacement of the power supply modules and printed circuit board.

2. Description of the Related Art

Over the past decade, personal computer systems have significantly increased in performance. Along with this advance is the need for continuously and reliably supplying power to the computer system so as to minimize loss of data and to provide continual access to the computerized information. Typical computer systems are serviced by a single power supply module, which acts as a single point of failure in the event that the power supply module malfunctions, causing delay and user down time. In addition, while systems exist which allow the user to replace a malfunctioning power supply module with a functioning unit by simply plugging in the new unit, in most cases, the new unit cannot be directly plugged in while the system is running and plugged into an alternating current outlet, and thus the power supply module is not hot swappable.

Accordingly, there is a need in the technology for a power supply system which provides power supply modules which not only are redundant and hot swappable, but are also easily accessible and blind-mated to a printed circuit board assembly.

Most computer components such as power supplies and printed circuit boards are mounted to the housing or chassis by means of fasteners such as screws. These removable parts are candidates for upgrades and replacements and, as a result, need to be easily accessible. In many cases such as this, the use of removable fasteners (like screws) creates a dangerous situation as the fasteners may easily fall into and cause shorts in components such as drives, power supplies, or circuit boards during installation and removal.

In addition, while power supply-related problems are often easily isolated to a specific component, removal of the component generally involves the removal of mounting fasteners, such as screws, and the disconnection of electrical connectors, which creates additional inconvenience and delay. Moreover, the new or reconditioned power supply component must be manipulated into place within the chassis and must be aligned properly so as to be installed correctly. Such removal and installation increases the amount of time required to service the power supply components, resulting in higher service costs and greater delay in servicing.

Thus, there exists a need in the technology for a power supply system having a single strong chassis which houses and secures all components such as power supply modules and the requisite printed circuit boards, while facilitating quick and convenient removal, replacement and upgrade of the power system.

Finally, computer systems that include redundant power supplies and other computer components are typically housed in a chassis that is not easily movable. This is a precaution to minimize damage to the computer components when the computer system is being moved. However, in an office environment, a computer system which functions as a server may need to be relocated several times during its useful life. As such, there is a need for providing a computer system that is robust and movable and which also can be reliably secured once it is positioned.

BRIEF SUMMARY OF THE INVENTION

The present invention provides a floating-plate connector assembly which includes a mounting plate on which are mounted a signal connector, a power connector, and a pair of guide pins. The mounting plate is in turn mounted on the rear panel of a power supply module so that the connector plate may move within certain predetermined limits in two axes. The floating-plate connector assembly mates with a printed circuit board firmly mounted without fasteners within a power supply chassis.

The present invention also provides for locating and securing the two power supply modules to the chassis without the use of removable fasteners, while facilitating the convenient removal and replacement of the power supply modules. The means for securing the power supply includes a handle which is connected by molded pins through brackets on the front of the power supply. The handle includes a cam and teeth which respectively engage a notch and holes located on the base of the chassis when rotated in a first direction. The power supply module is disengaged from the chassis when the handle is rotated in a second direction opposite to the first direction.

The present invention also provides a mounting assembly scheme for securing a printed circuit board in place in a chassis without the use of removable fasteners. In addition, the present invention provides a mechanism for securing a cosmetic faceplate or front door assembly to a chassis without the use of removable fasteners. The power supply system of the present invention also provides a brake lever assembly which locks two of the four wheels thereby securing the entire system to a fixed location while still providing the option of mobility simply by releasing the brake levers. These brakes also can be locked and concealed from unauthorized activation.

BRIEF DESCRIPTION OF THE DRAWINGS

FIG. 1 is a perspective view of the modular, redundant, hot swappable, blind mate power supply system shown located below a computer system, in accordance with a preferred embodiment of the present invention.

FIG. 2A is a cross-sectional view of the male portion of the floating-plate connector assembly of the present invention taken along line 2A—2A of FIG. 2.

FIG. 3 is a partially exploded perspective view of the modular, redundant, hot swappable, blind mate power supply system of FIG. 2, showing the printed circuit board locking assembly of the present invention.

FIGS. 5A and 5B are sectional views of the locking button of the front faceplate assembly taken along line 5—5 of FIG. 4.

FIGS. 6A and 6B are cross sectional views of a portion of the power supply module and the power supply chassis taken along line 6—6 of FIG. 2, showing the handle of the power supply module in a locked position and an unlocked position respectively.

FIGS. 7A and 7B are cross sectional views of the brake lever assembly of the present invention taken along line 7—7 of FIG. 2, showing the brake lever in an unlocked position and a locked position respectively.

DETAILED DESCRIPTION OF THE INVENTION

Figure 2:
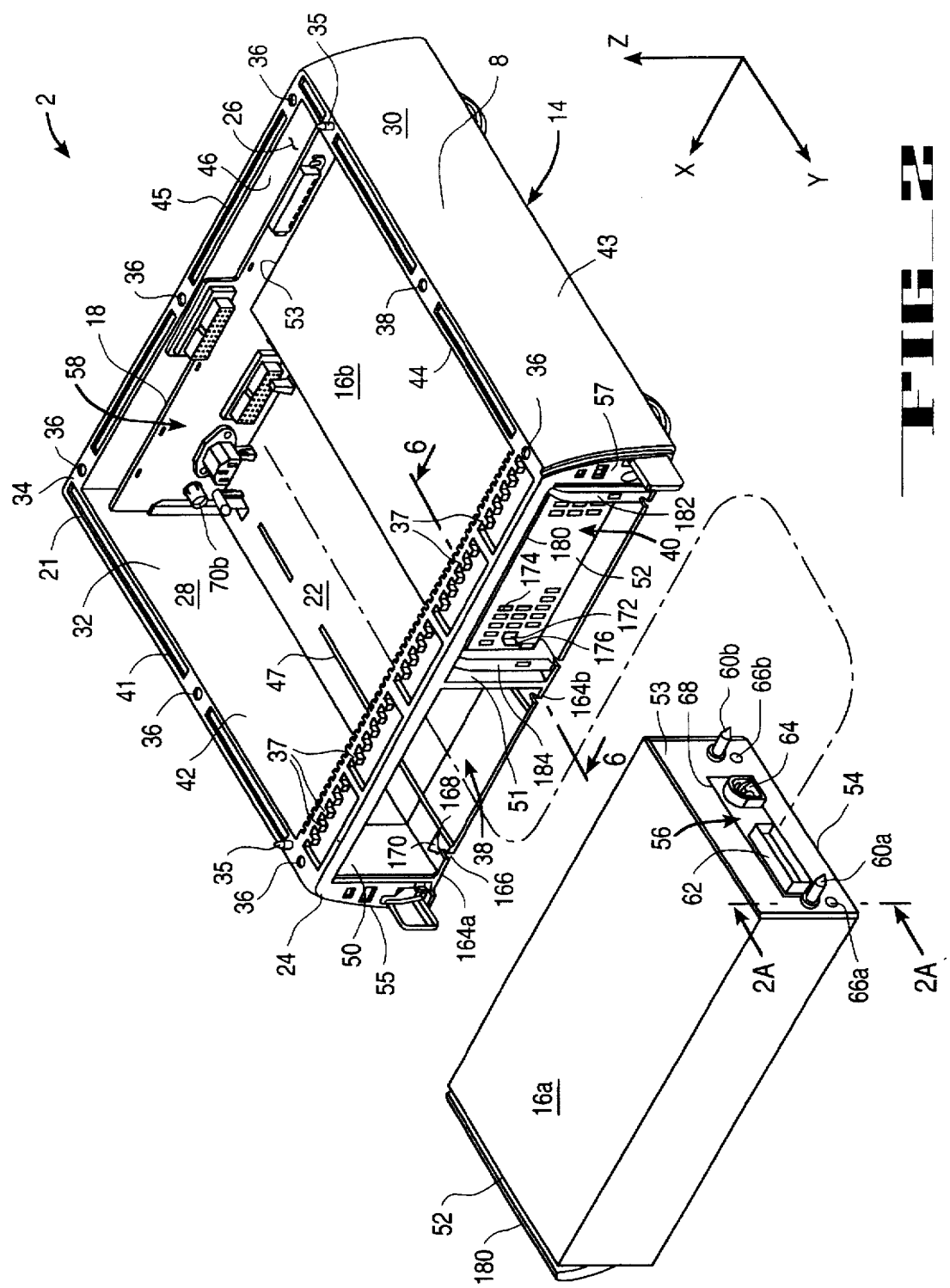
FIG. 2 is a partially exploded perspective view of the modular, redundant, hot swappable, blind mate power supply system in accordance with a preferred embodiment of the present invention.

FIG. 1 illustrates a perspective view of the modular, redundant, hot swappable, blind mate power supply system 2 shown located below a computer system chassis 4, in accordance with a preferred embodiment of the present invention. As shown, the power supply system has a front faceplate assembly 6, chassis 8 and wheels 10 (only two shown in FIG. 1) located below each corner of the power supply system 2. The power supply system 2 provides the power necessary for the operation of the computer system 4.

FIG. 2 illustrates a perspective view of the modular, redundant, hot swappable, blind mate power supply system 2 in accordance with a preferred embodiment of the present invention. The power supply system 2 comprises a unibody chassis 8 which encloses first and second power supply modules 16a and 16b, a printed circuit board 18 and a faceplate assembly 6 (shown in FIG. 1). In a preferred embodiment, the chassis 8 is molded from a polycarbonate material using a gas counter-pressure structural foam molding process, as is known in the technology.

The chassis 8 has a generally U-shaped cross section and comprises a top portion 21, a base 22, a front portion 24, a rear wall 26, a left-side wall 28 and a right-side wall 30. The top portion 21, base 22, front portion 24, rear wall 26, left-side wall 28 and right-side wall 30 are all integrally formed. The top portion 21 of the chassis 8 defines a rectangular opening 32, the perimeter 34 of which comprises a plurality of mounting posts 35, a plurality of mounting holes 36, and a plurality of mounting brackets 37, all of which cooperate with the bottom surface of the computer system chassis 4 to engage and lock the computer system chassis 4 on top of the chassis 8. In addition, the front portion 24 of the chassis 8 defines a first opening 38 and a second opening 40 for receiving the first and second power supply modules 16a and 16b respectively into the chassis 8.

The left-side wall 28 of chassis 8 has an outer surface 41 and an inner surface 42 and the right-side wall 30 has an outer surface 43 and an inner surface 44. In the same manner, the rear wall 26 has an outer surface 45 and an inner surface 46. The base 22 of the chassis 8 has a pair of guide rails 47 (only one shown in FIG. 2) running parallel to each side wall 28 and 30, which facilitate the insertion of the power supply modules 16a and 16b. In addition, each power supply module 16a and 16b is separated by a rib 48 (shown in FIG. 3) which runs parallel to the side walls 28 and 30 and which extends from the middle of the base 22 and upwardly from the base 22. As shown in FIG. 2, each power supply module has a front panel 52 and a rear panel 53. In a preferred embodiment, the inner surfaces of the chassis 8 is sprayed with copper to reduce electromagnetic interference from the power supply modules 16a, 16b and the printed circuit board 18.

The individual elements of the power supply system 2 will now be described in detail. For the purpose of this description, a coordinate system is provided having coordinates oriented as follows: an "X-direction" coordinate parallel to the longitudinal axis of the front portion 24 of the chassis 8; a "Y-direction" coordinate parallel to the right-side wall 30 of the chassis 8; and a "Z-direction" coordinate perpendicular to both the X-direction coordinate and the Y-direction coordinate. In addition, as used herein, "in the X-direction" means in a direction parallel to the X-direction coordinate, "in the Y-direction" means in a direction parallel to the Y-direction coordinate, and "in the Z-direction" means in a direction parallel to the Z-direction coordinate.

The floating-plate connector assembly 54 of the present invention will now be discussed. The floating-plate connector assembly 54 comprises a male portion 56 located on the rear panel 53 of each power supply module 16a and 16b, and a female portion 58 located on the printed circuit board 18. FIG. 2A is a cross-sectional view of the male portion 56 of the floating-plate connector assembly 54 taken along line 2A—2A of FIG. 2. As shown, the male portion 56 comprises a connector plate 59 on which is mounted a pair of threaded studs 51a and 51b (the cross-sectional view of stud 51a is shown in FIG. 2A). The threaded stud 51a is popped into a hole on the connector plate 59. The rear panel 53 includes a pair of connector holes 49a and 49b of diameter D, which correspond to the pair of threaded studs 51a and 51b.

During assembly, the connector plate 59 is abutted against the inner wall of the rear panel 53 so that the studs 51a and 51b are inserted in the holes 49a and 49b. A guide post 60a or 60b of diameter d (where d<D), is screwed onto the threaded studs 51a and 51b respectively. As a result, the guide posts 60a and 60b may move within the clearance allowed by the larger diameter of the holes 49a and 49b on the real panel 53. In this manner, the connector plate 59 is mounted onto the rear panel 53 so that it "floats", that is, the connector plate 59 may move within a predetermined limit in the X-Z plane. In a preferred embodiment, the nominal radial "float" is (D-d)/2 in the X-direction and in the Y-direction. This "floating" arrangement facilitates the installation of the power supply module 16a or 16b.

In a preferred embodiment, the guide post 60a or 60b has a body 61a, a shoulder 61b and a base stem 61c. In one preferred embodiment, the thickness of the rear panel 53 is t, where the distance from the proximal end of the stem 61c to the shoulder 61b is h, where h is greater than t by a small amount. This arrangement minimizes tipping of the guide posts 60a and 60b . Positioned between the holes 49a and 49b are a male signal and power pin connector 62 and a male alternating current connector 64. In a preferred embodiment, the male alternating current connector 64 comprises a plug with three pins. Positioned below each guide post 60a and 60b are extruded metal shock pin holes 66a and 66b. The connector plate 59 is mounted on the back panel 53, over a rectangular aperture 68 on the rear panel 53 of the power supply module 16a or 16b.

As shown in FIG. 2 and as discussed earlier, the front portion 24 of the chassis 8 defines a first opening 38 and a second opening 40 for receiving the first and second power supply modules 16a and 16b respectively. The front portion 24 also comprises first and second surfaces 55 and 57, which are located to the left of the first opening 38 and to the right of the second opening 40 respectively. The second surface 57 is the mirror-image of the right surface 55. In addition, the left half of the printed circuit board 18 is identical to the right half of the printed circuit board 18. A female portion 58 mating to the floating-plate connector assembly 54 is located on the left half and the right half of the printed circuit board 18. For present discussion purposes, only the left half on the printed circuit board 18 will be discussed, on which is located the female portion 58 of the floating-plate connector assembly 54.

The female portion 58 of the floating-plate connector assembly 54 comprises a pair of guide post receptacles 70a and 70b (see FIG. 3) which receive the guide posts 60a and 60b respectively. Positioned between the guide post receptacles 70a and 70b are: a female digital pin connector 72 which receives the male digital pin connector 62 and a female alternating current connector 74 which receives the male alternating current connector 64. Positioned below each guide post receptacle 70a and 70b is a shock pin 76a and 76b which engages the power supply holes 66a and 66b respectively. The shock pin 76a or 76b each extends from the base 22 and are designed such that the tip of the shock pin 76b, which is closest to the left side wall 28, provides a tight fit in the Z-direction as well as in the X-direction, while the tip of shock pin 76a only provides a tight fit in the Z-direction. In this manner, the tip of shock pin 76a provides some tolerance in the X-direction for aligning the shock pins 76a and 76b to the power supply holes 66a and 66b. Once aligned, the shock pins 76a and 76b fit tightly into the power supply holes 66a and 66b. The shock pins 76a and 76b and the power supply holes 66a and 66b provide a means for securing the power supply modes 16a and 16b to the chassis 8, so that there will be little movement of the components during shipment.

The "floating" arrangement permits the user to approximately align the power supply module 16a or 16b while installing the power supply module 16a or 16b. Once inserted into the opening 38 or 40, the guide rails 47 guide the power supply module 16a or 16b backwards toward the printed circuit board 18. The power supply holes 66a and 66b guide the user in aligning the male portion 56 of the connector assembly 54 with the female portion 58 of the connector assembly 54. The "floating" arrangement permits the user to approximately align the power supply holes 66a and 66b with the guide post receptacles 70a and 70b. Once approximately aligned, the shock pins 76a and 76b guide the power supply module 16a or 16b in position as the power supply module 16a or 16b is moved backwards in the chassis 8. The male alternating current connector 64 next engages the female alternating current connector 74, and finally, the male digital pin connector 62 engages the female digital pin connector 72. In this manner, the power supply module 16a or 16b is securely blind-mated to the printed circuit board 18. When both power supply modules 16a and 16b are in place, and the power is turned on, the power supply system 2 serves as a redundant hot swappable, blindly-mated power supply system.

An assembly 80 for securing a printed circuit board 18 in place in chassis 8 without the use of fasteners in a power supply system will now be discussed. As shown in FIG. 3, the assembly 80 comprises a pair of vertical slots 82 and 84 (not shown) which are located in the proximity of the rear wall 26. The vertical slots 82 and 84 extend upward (in the Z-direction) from and the base 22 and inwards (in the X-direction) from the inner surfaces 42 and 44 of the left-side wall 28 and the right-side wall 30 respectively. In addition, the vertical slots 82 and 84 are integral with the inner surfaces 42, 44 and base 22. The vertical slots 82 and 84 receive and retain the printed circuit board 18 along the Z-direction.

The assembly 80 also comprises a plurality of supporting flanges 86, each of which extend upwardly (in the Z-direction) and integrally from the base 22 and outwardly (in the Y-direction) from the inner surface 46 of the rear wall 26. The assembly 80 further comprises a plurality of supporting posts 88 which extend upwardly (in the Z-direction) and are formed integrally with the base 22. The supporting posts 88 are offset from the supporting flanges 86 along the Y-direction by at least the thickness of the connecting board 18. In addition, each supporting flange 86 is offset from each supporting post 88 along the X-direction, so that the position of a supporting flange 86 is followed by a supporting post 88, with the remaining flanges 86 and posts 88 positioned in alternating fashion.

The assembly 80 additionally comprises a protrusion 90 located midway between the first flange 86 and the first post 88 in both the X-direction and the Y-direction. The printed circuit board 18 has a lower edge 19 which includes a notch 23. The flanges 86 and posts 88 cooperate to receive and retain the printed circuit board 18 in the Y-direction without the use of fasteners. The protrusion 90 engages and secures the notch 23 on the printed circuit board in X-direction when the printed circuit board 18 is received into the slots 82, 84, flanges 86 and posts 88. In this manner, the printed circuit board 18 is retained and secured in chassis 8, the X- and Y-directions, without the use of removable fasteners. When the power supply module(s) 16a or 16b are installed, the printed circuit board 18 is secured in the Z direction, still without fasteners.

Figure 4:
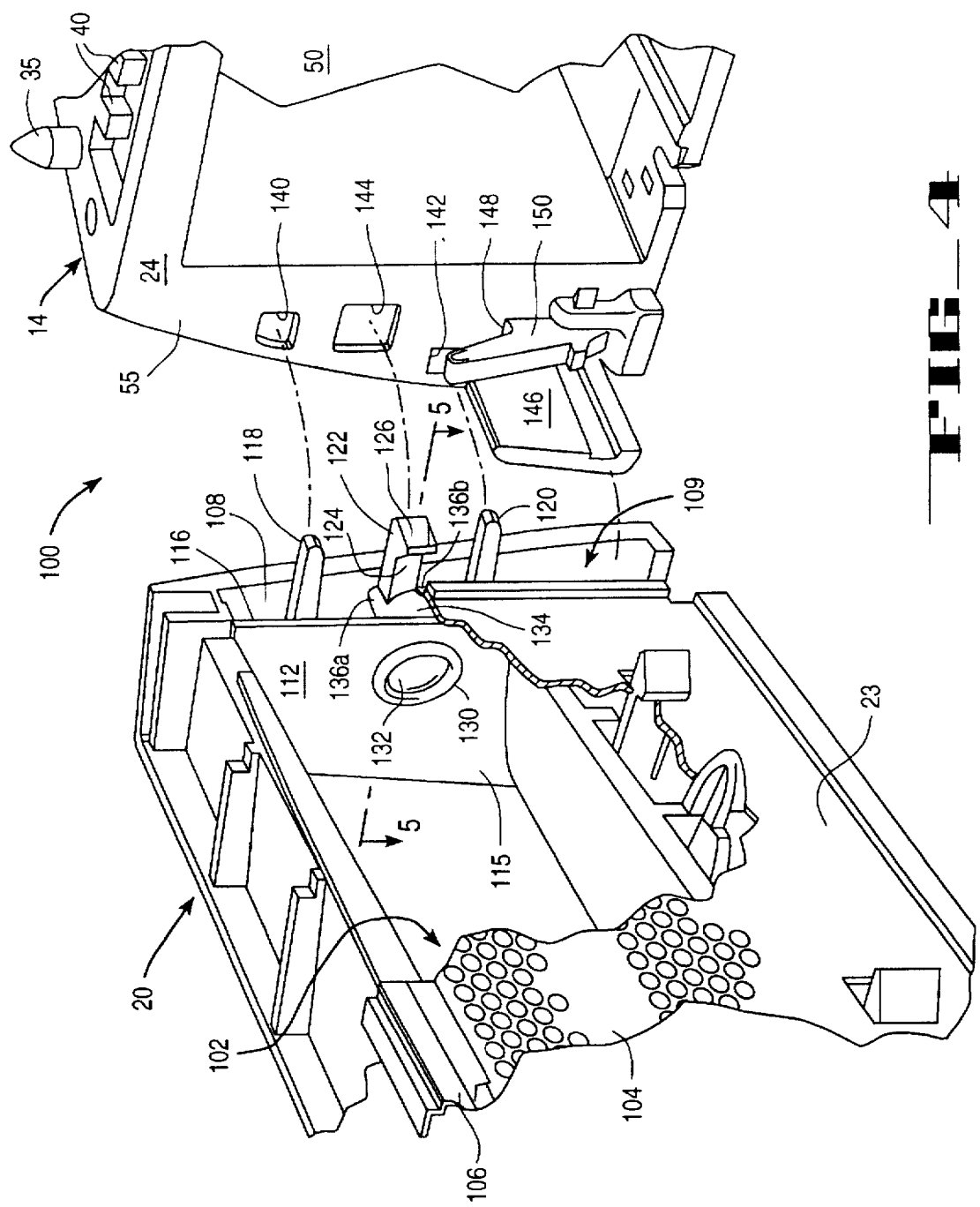
FIG. 4 is a partially exploded perspective view of the modular, redundant, hot swappable, blind mate power supply system of FIG. 2 illustrating the front faceplate assembly of the present invention.

An assembly 100 for securing and removing the cosmetic faceplate 20 from the chassis 8 without the use of removable fasteners will now be described. As shown in FIGS. 1 and 4, the faceplate 20 comprises a outer side 25 and a inner side 27. The inner side 27 defines an rectangular, central aperture 102 which receives a grill 104 which is mounted onto the inner side 27 of the faceplate 20 and is sealed by a gasket 106. The grill 104 serves in ventilating the power supply modules 16a and 16b, and provides protection against electromagnetic interference. On either side of the central aperture 102 is a recess 108, 110 (only recess 108 is shown in FIG. 4). The recesses 108 and 110 are separated from the central aperture 102 by side walls 112 and 114 (only side wall 112 is shown in FIG. 4) respectively. The side wall 112 has an outer face 115 and an inner face 116. Extending backwards from the inner face 116 of the side wall, in the Y-direction, are two mounting posts 118 and 120, and a deflectable latch 122 which is positioned between the posts 118 and 120. The deflectable latch 122 is generally L-shaped, and has a longitudinal body 124 along the Y-direction which extends into a short tab 126 along the X-direction. Located approximately in the center of the side wall 112 is an aperture 125 which receives a locking button 130. The locking button 130 has a head 132 and a body 134. At the proximal end of the body 124 are three legs 136a–136c (only 136a and 136b are shown in FIG. 4) which grip the body 124 of the latch 122.

As shown in FIG. 4, the front portion 24 of the chassis 8 has first and second surfaces 55 and 57 (in FIG. 2), which are located to the left of the first opening 38 and to the right of the second opening 40 respectively. The second surface 57 is the mirror-image of the first surface 55. For present purposes, only the first surface 55 will be discussed. The first surface 55 of the front portion 24 defines first and second post apertures 140 and 142 and bracket aperture 144 (located between the first and second post apertures 140 and 142) which respectively receive mounting posts 118, 120 and deflectable latch 122 of the faceplate 20. The front portion 24 also comprises a supporting tab 146 and a lever notch 148 which receives a brake lever 150. The supporting tab 146 and brake lever 150 fit into the lower portion 109 of recess 108 of the faceplate 20 when the faceplate 20 is assembled onto the chassis 8.

FIGS. 5A and 5B illustrate a cross-sectional view of the mounting assembly 100 along lines 5—5 of FIG. 4. To secure the faceplate 20 onto the chassis 8, one simply aligns the face place 20 with the chassis 146 and pushes it on until it snaps into place. There is no need to depress the locking button 130. The faceplate 20 is thus mounted on the front portion 24 of the chassis, with mounting posts 118, 120 and latch 122 being inserted into notches 140, 142 and 144 respectively, and supporting tab 146 and brake lever 150 being received into the lower portion 109 of recess 108. When the faceplate 20 is in place, the locking button 130 snaps into place (FIG. 5B) and the tab 126 secures the notch 144, locking the faceplate 20 onto the front portion 24 of the chassis 8.

To remove the faceplate 20, the locking button 130 is depressed, which deflects the body 124 of the latch 122, unlatching the latch 122 from notch 144. The faceplate 20 is thus released and can be dismounted from the front portion 24 of the chassis 8. In this manner, the faceplate may be secured to the chassis 8 without the use of removable fasteners, while providing a means for easy access to the power supply modules 16a and 16b by simply depressing the locking buttons 130.

An assembly 160 for locking a power supply module in a fixed position on chassis 8 without the use of removable fasteners in a power supply system will now be described. FIGS. 6A and 6B illustrate cross-sectional views of the power supply module 16a or 16b in an unlocked position and a locked position respectively. The assembly 160 comprises a pivoted handle 162 mounted on the front panel 52 of the power supply module 16a and 16b, which cooperates with two gear-tooth receptacles 164a and 164b located behind the front portion 24 and along the X-axis of the base 22. Each gear-tooth receptacle 164a and 164b includes a first notch 166, a second and a third aperture 168 and 170. Each gear-tooth receptacle 164a and 164b cooperates to lock the power supply module 16a or 16b in position on the chassis 8, as will be discussed in detail in the following sections.

The front panel 52 of each power supply module 16a and 16b includes two generally L-shaped tabs 172, 173 (only one tab 172 is shown in FIG. 2) which are fastened to the front panel 52 at one end 174 along the X-direction and which extend in the Y-direction at the other end 176. The extending end 176 of the tab 172 defines a circular aperture 178.

The handle 162 has a generally inverted U-shape cross section taken along the X-Z plane. It comprises a horizontal bar 180 with two downwardly-extending legs 182 and 184 (see FIG. 2; only one leg is shown in FIG. 4). Each leg 182 and 184 defines a generally square aperture 186 which extends and flares into a large square aperture through the leg 182 or 184 in the Y-direction. In addition, each leg 182 and 184 has a foot portion 189, which comprises a cam 190 and teeth 192 and 194, arranged diagonally and outwardly along the X-Y plane. The cam 190, and teeth 192 and 194 cooperate with the notch 166, apertures 168 and 170, respectively, to engage and secure the power supply module 16 in a fixed position on the chassis 8. Located along the inner wall of each aperture 186 is a post 188 which is formed integrally with the handle 162. The handle 162 is installed by spreading the legs 182 and 184 and inserting each of the posts 188 into the apertures 178 of the L-shaped tabs 172 which are located on the front panel 52. No removable fasteners are required. The post 188 cooperates with the aperture 178 to permit the handle 162 to pivot from a first upright position (in the Z-direction) to a second downward position (in the Y-direction), as shown in FIGS. 6A and 6B respectively. In this manner, the power supply modules 16a and 16b may be installed in a fixed position on the chassis 8 without the use of removable fasteners.

A brake lever assembly 200 for locking the wheels on the power supply system of the present invention will now be discussed. FIGS. 7A and 7B are cross sectional views of the brake lever assembly 200 of the present invention taken along line 7—7 of FIG. 2, showing the brake lever 150 in an unlocked position and a locked position respectively. As shown in FIGS. 2, 7A and 7B, the chassis 8 rests on four wheels 61 (only two are shown in FIG. 2) each of which is positioned in the proximity of the four corners of the chassis 8. As discussed earlier, the front portion 24 of the chassis 8 defines a lever notch 148 which receives a brake lever 150. The lever notch 148 is generally rectangular and has a shoulder 149. A brake plate 151 located behind the notch 148 extends from chassis 8, downwards from behind the front portion 24. The brake plate 151 is integrally formed with the chassis 8.

The brake lever 150 has a cam surface 196 and a tapered body 198. A side view of the brake lever 150 is shown in FIG. 7A. As shown, the side of the cam surface 196 of the brake lever 150 has a first radius A and a second radius B, where B is longer than A. The cam surface 196 also includes a lip 198 which engages the bottom portion of the notch 148. Extending laterally from the brake lever 150 between the distal ends of the brake lever 150 are two posts 202 (only one shown in FIGS. 7A and 7B) which rest on and pivot the shoulder 149 when the brake lever 150 is assembled into the notch 148. When thus assembled, the cam surface 196 rests against the brake plate 151 so that the radius A is parallel to the X-Y plane. The wheel 10 is located behind the brake plate 151 by a distance approximately equal to the difference between the values of the radii (B-A). In this position, the cam surface 196 of the brake lever 150 fits comfortably against the brake plate 151, but does not deflect the brake plate 151, as shown in FIG. 7A. As a result, the wheel is not locked and the chassis 8 may be moved around as desired. When the tapered body 198 of the brake lever 150 is pushed downwards, as shown in FIG. 7B, the radius B of the cam surface 196 is parallel to the X-Y plane and the cam surface 196 deflects the brake plate 151 backwards to that the wheel 10 is engaged and locked by the brake plate 151. In this manner, the wheels 10 of the chassis 8 may be locked in position using only two parts, while providing the option of portability to the user when the wheels 10 are unlocked.

Because the assembly of the present invention involves relatively few parts, ease of manufacture and cost savings are apparent. In addition, the engagement and snap-on features of the present invention eliminates the use of removable fasteners to mount the power supply modules 16a and 16b and printed circuit board 18 to the chassis, mounting the wheels 10, installing the brake lever 150, and mounting the cosmetic faceplate 20, thereby increasing the reliability of the power supply system 2, as well as user convenience.

Modifications and variations of the embodiments described above may be made by those skilled in the art while remaining within the true scope and spirit of this invention. Thus, although the present invention has been described in terms of certain preferred embodiments, other embodiments that will be apparent to those of ordinary skill in the art are also within the scope of this invention. Accordingly, the scope of the invention is intended to be defined only by the claims which follow.

We claim:

1. An assembly for mounting a power supply and securing a faceplate to a chassis, comprising:

a power supply;

a chassis having a first opening that receives the power supply;

a handle pivotably connected to the power supply, the handle having a cam which engages the chassis when the handle is rotated in a first direction to move the power supply from an unlocked position to a locked positions a faceplate having a surface;

a latch which extends from the faceplate; and a locking button connected to the latch through said surface of said faceplate, wherein the chassis has a second opening for receiving the latch, and wherein the latch disengages the chassis when the locking button is depressed, and the latch engages the chassis when the locking button is released and the faceplate is pushed towards the chassis.

2. The assembly of claim 1, wherein the locking button comprises a head and a body, the body extending into a plurality of legs which grip the latch.

3. The assembly of claim 1, wherein the cam disengages the chassis when the handle is rotated in a second direction to move the power supply from a locked position to an unlocked position.

4. The assembly of claim 1, wherein the chassis has a notch for receiving the cam.

5. The assembly of claim 4, wherein the handle further comprises a plurality of teeth located behind the cam and wherein the chassis further comprises a plurality of apertures located behind the notch, for receiving the plurality of teeth.

6. The assembly of claim 4, wherein the cam and the plurality of teeth are located along a first diagonal and the notch and the plurality of apertures are located along a second diagonal corresponding to the first diagonal.

* * * * *